United States Patent
Sung et al.

(10) Patent No.: US 6,335,118 B1
(45) Date of Patent: Jan. 1, 2002

(54) SULFURATED HYDROCARBON MATERIALS HAVING HIGH CAPACITY AND SECONDARY CELLS USING THE SAME

(75) Inventors: Hyun Kyung Sung, Taejeon; Hyun Jung Kim, Kimhae; Kwanyoung Lee, Taejeon, all of (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 09/468,090

(22) Filed: Dec. 21, 1999

(30) Foreign Application Priority Data

Mar. 10, 1999 (KR) .............................................. 99-7846

(51) Int. Cl.$^7$ .......................... H01M 4/60; C08F 32/00; C08G 75/14
(52) U.S. Cl. ..................... 429/213; 429/212; 525/332.1; 528/389
(58) Field of Search ................................ 429/213, 212, 429/218.1, 231.9; 528/381, 386, 387, 388, 389; 252/500; 525/354, 364, 367, 343, 332.1; 136/238, 263; 427/58, 388.5; 526/335; 585/500, 955; 208/46, 58, 71, 78

(56) References Cited

U.S. PATENT DOCUMENTS

| | | | |
|---|---|---|---|
| 4,664,991 A | 5/1987 | Perichaud et al. | 429/194 |
| 4,833,048 A | 5/1989 | Dejonghe et al. | 429/104 |
| 4,917,974 A | * 4/1990 | De Jonghe et al. | 429/104 |
| 5,441,831 A | 8/1995 | Okamoto et al. | 429/213 |
| 5,460,905 A | 10/1995 | Skotheim | 429/213 |
| 5,529,860 A | 6/1996 | Skotheim et al. | 429/213 |
| 5,571,292 A | 11/1996 | Sotomura et al. | 29/623.5 |
| 5,601,947 A | 2/1997 | Skotheim et al. | 429/213 |
| 5,665,492 A | 9/1997 | Sotomura | 429/213 |

(List continued on next page.)

FOREIGN PATENT DOCUMENTS

EP 0797264 9/1997

OTHER PUBLICATIONS

Paul D. Barlett et al, J. Org. Chemistry, "Sulfuration of the Norbornene Double Bond", pp. 4937–4943, 1987.

William H. Watson et al, Acta Cryst. "Exo–9,10,11–Trithiate–tracyclo 5.5.1.0 . . . ", pp. 332–334, 1986.

H. Fritz et al, Tetrahedron Letters, No. 18, "2,3,4–Trithiabi–cyclo[4,3,1] . . . ", pp. 1659–1660, 1974.

S. Inoue et al, Phosphorus and Sulfur, "A New Type of Photo–chemical Addition . . . ", pp. 219–221, 1978.

M. L. Poutsma, J. Am. Chem. Soc., "Active Sulfuration of Norbornenes", pp. 5415–5416, 1965 Not month available.

Ronald A. Rizzo et al, Sodium/Sulfur Batteries, pp. 32–1—32–27, 1980 Not month available.

*Primary Examiner*—Stephen Kalafut
*Assistant Examiner*—Raymond Alejandro
(74) *Attorney, Agent, or Firm*—Jacobson Holman, PLLC (57) ABSTRACT

The present invention relates to a novel sulfurated hydrocarbon material having electrochemical activity, high capacity, and good reversibility, which can be used as an electrode material for the secondary battery. More particularly, it relates to a sulfurated hydrocarbon material, which is prepared by the sulfuration of the olefinic unsaturated hydrocarbon, in the presence of a amine promoter. The sulfurated hydrocarbon material contains from 40 to 88% of sulfur and is represented by the formula $(CH_xS_y)_z$, wherein: x is a real number in the range of $0.5 \leq x \leq 1.75$; y is a real number in the range of $0.2 \leq y \leq 3.2$; and z is an integer equal to or greater than 5. Also, the present invention provides a secondary battery comprising i) a positive electrode comprising said sulfurated hydrocarbon compound; ii) a polymer electrolyte; and iii) a negative electrode made of alkali metal or alkali metal alloy.

15 Claims, 4 Drawing Sheets

U.S. PATENT DOCUMENTS

| | | | |
|---|---|---|---|
| 5,686,201 A | 11/1997 | Chu | 429/52 |
| 5,690,702 A | 11/1997 | Skotheim et al. | 29/623.1 |
| 5,723,230 A | 3/1998 | Naoi et al. | 429/104 |
| 5,789,108 A | 8/1998 | Chu | 429/213 |
| 5,919,587 A * | 7/1999 | Mukherjee et al. | 429/213 |
| 6,110,619 A * | 8/2000 | Zhang et al. | 429/213 |
| 6,190,426 B1 * | 2/2001 | Thibault et al. | 29/623.2 |

* cited by examiner

SULFURATED HYDROCARBON MATERIALS HAVING HIGH CAPACITY AND SECONDARY CELLS USING THE SAME

BACKGROUND OF THE INVENTION

1. Field of the Invention

The present invention relates to a novel sulfurated hydrocarbon material having electrochemical activity, high capacity, and good reversibility, which can be used as an electrode material for the secondary battery. More particularly, it relates to a sulfurated hydrocarbon material, which is prepared by the sulfuration of the olefinic unsaturated hydrocarbon, in the presence of a amine promoter. The sulfurated hydrocarbon material contains from 40 to 88% of sulfur and is represented by the formula $(CH_xS_y)_z$, wherein: x is a real number in the range of $0.5 \leq x \leq 1.75$; y is a real number in the range of $0.2 \leq y \leq 3.2$; and z is an integer equal to or greater than 5. Also, the present invention provides a secondary battery comprising i) a positive electrode comprising said sulfurated hydrocarbon compound; ii) a polymer electrolyte; and iii) a negative electrode made of alkali metal or alkali metal alloy.

2. Description of Prior Art

Battery has a wide spectrum of applications as a key component of modern portable electronic devices. Especially, secondary battery is essential to the development of hand-carrying devices such as mobile telecommunication tools and notebook computers. A series of development of nickel-cadmium, nickel-metal hydride, and lithium ion types has provided advantages in reducing the size and weight of secondary battery. However, the rapid advancement of electronic technology and widespread use of portable devices have been continuously demanding the next generation battery which has higher energy per unit volume or unit weight than the present battery.

Various sulfur compounds including elemental sulfur, organic disulfide, and organosulfur material have been suggested as an electrode material for secondary battery.

The elemental sulfur electrode utilized a reversible redox reaction between sulfur atom (S) and sulfur anion ($S^{2-}$), which accounts for 1,675 mAh/g of the theoretical capacity. The Na—S battery comprising i) a positive electrode containing elemental sulfur; ii) a negative electrode consisting of sodium metal; and iii) a solid electrolyte, such as β-alumina has been suggested(R. A. Rizzo, W. L. Towle, and M. L. McClanahan, "Sodium/Sulfur Batteries", in D. Linden Ed. "Handbook of Batteries and Fuel Cells", pp. 32-1~32-27, McGraw-Hill, New York, 1984). The Na—S battery shall be operated higher than 300° C., where electrode material exists in molten phase, which is required for proper activation of electrode and sufficient ion conductivity. Therefore, said battery has been applied to the module of a large battery rather than the power source of a small electronic device, because it demands extra equipments for maintaining high temperature and ensuring safety.

For solving these drawbacks, U.S. Pat. Nos. 5,686,201 and 5,789,108 suggested the secondary battery comprising i) a positive electrode comprising active-sulfur; ii) a negative electrode using lithium metal; and iii) a polymer electrolyte. Even though said battery containing a positive electrode made of active-sulfur has a high capacity of 500 mAh/g-cathode, the maximum capacity was obtained at 90° C. and its efficiency at room temperature or sub-room temperature is limited.

The secondary battery using i) organic disulfide compound as a positive electrode and ii) alkali metal as a negative electrode has been disclosed in U.S. Pat. No. 4,833,048. 2,5-dimercapto-1,3,4-thiadiazole (DMcT) and trithiocyanuric acid (TTCA) are representative examples of organic disulfide compound and have high theoretical capacity of 357 and 454 mAh/g, respectively, even though the organic disulfide compound provides only one electron per sulfur in redox reaction, since sulfur atom is connected to organic moiety. A method improving efficiency of organic disulfide electrode by adding polyaniline was disclosed in U.S. Pat. No. 5,571,292.

When two or more thiol groups present in a molecule of organic disulfide, redox reaction of organic disulfide is accompanied with polymerization/monomerization upon formation and cleavage of S—S bond. Monomerized dimercapto or dithiolato organic material is soluble in organic slovent present in the composition of electrolyte. Dissolution and consequent diffusion of organic disulfide away from the electrode leads to the decrease in the capacity of electrode and renders organic disulfide electrode material a problematic situation for prolonged use and repeated cycle required for secondary battery. Methods to increasing cycleability by preventing a separation of the monomeric organic disulfide material from the electrode include an addition of copper or silver metal powder to the electrode composition as disclosed in U.S. Pat. No. 5,665,492. And, a method using metal complex of organic disulfide as an electrode material was described in European Pat. 797,264, A2.

An electrode material having high capacity by introducing multi-sulfide bond into organic disulfide material was disclosed in U.S. Pat. No. 5,723,230. A lithium secondary battery using organic sulfide containing heptasulfide has a theoretical capacity more than 4,000 Wh/kg. But, when multi-sulfide bond is involved in electrode reaction, the sulfur-sulfur bond in polymer structure is cleaved upon reduction in the way organic disulfide material undergoes. Problematic diffusive dissolution of monomerized active material takes place and cause the decrease in the cycleability.

Since elemental sulfur has high energy density, efforts to prepare organosulfur material with high sulfur content have been continues. U.S. Pat. No. 4,664,991 suggests a polymeric organosulfur material which was prepared by reacting polyacetylene and sulfur at high temperature. Energy density of a protype cell with the organosulfur polymer was reported to be 1,850 Wh/kg.

Further, polycarbon disulfide (PCS) which is prepared by reductive polymerization of carbon disulfide was disclosed in U.S. Pat. Nos. 5,441,831, 5,460,905, 5,601,947, and 5,690,702. U.S. Pat. No. 5,529,860 suggested polyacetylene-co-polysulfur (PAS) material prepared by the reaction of acetylene with sulfur in the presence of metal amide. The composition of organosulfur compound is represented by the formula $(CS_m)_n$ where $m \geq 2.5$ and has theoretical capacity of 700~1,200 mAh/g. Even though the exact structure of above materials has not been determined, the organosulfur compound was suggested to comprise the structure units shown below.

The PCS material basically has carbon-carbon bond backbone and does not undergo polymerization/depolymerization upon redox reaction. However, double bonds suggested in the structural unit are chemically vulnerable and provide potential reactive sites upon repeated oxidation and reduction.

Even though many attempts have been made to use sulfur containing compounds as a high-energy electrode material as described above, said sulfur materials needs to be improved to have higher discharge capacity and extended cycle life for its practical use in rechargeable battery.

SUMMARY OF THE INVENTION

The object of the present invention is to provide a novel sulfurated hydrocarbon (SHC) material having electrochemical activity, high capacity, and good reversibility which is useful as an electrode material of a secondary battery with high energy density per weight and good cycleability.

The SHC material of the present invention, which is prepared by the sulfuration of unsaturated olefinic hydrocarbon compound in the presence of an amine promotor, contains from 40 to 88% of sulfur and is represented by the formula $(CH_xS_y)_z$, wherein: x is a real number in the range of $0.5 \leq x \leq 1.75$; y is a real number in the range of $0.2 \leq y \leq 3.2$; and z is an integer equal to or greater than 5. The SHC material of the present invention has a stable polymeric backbone consisting of carbon-carbon bond which is not altered upon oxidation or reduction Another object of the present invention is to provide a secondary battery comprising i) a positive electrode comprising said SHC material; ii) a polymer electrolyte; and iii) a negative electrode made of alkali metal or alkali metal alloy.

Accordingly, the present invention provides a rechargeable secondary battery having high capacity at room temperature. Further, the secondary battery of the present invention consists of all solid components and dose not occur any problems relating to the use of liquid electrolyte such as leakage or pressure development, and it can be easily fabricated in a suitable shape according to various application purposes of battery.

DETAILED DESCRIPTION OF THE INVENTION

The object of the present invention is to provide the novel sulfurated hydrocarbon (SHC) material of the present invention having electrochemical activity, high capacity, and good reversibility, which is prepared by sulfuration of unsaturated olefinic hydrocarbon compound in the presence of an amine promotor. The SHC material of the present invention has sulfur content of 40 to 88 wt. % and is represented by the formula $(CH_xS_y)_z$, wherein: x is a real number in the range of $0.5 \leq x \leq 1.75$; y is a real number in the range of $0.2 \leq y \leq 3.2$; and z is an integer equal to or greater than 5.

Also, said SHC material of the present invention has a stable polymeric structure consisting of carbon-carbon bond. The stable carbon backbone of SHC material is not altered upon oxidation or reduction, whereas a reversible redox reaction is accompanied with cleavage and regeneration sulfur-sulfur bond connected to carbon skeleton.

The SHC material of the present invention comprises at least one or more of structural moieties of the followings.

wherein, n is an integer in the range of $1 \leq n \leq 6$; m is an integer in the range of $1 \leq m \leq 8$; 1 is an integer equal to or greater than 1.

The SHC material of the present invention is prepared by sulfuration of an unsaturated olefinic hydrocarbon compound, in the presence of an amine promoter. The reaction of olefin and sulfur is directly related to the vulcanization of rubber. In vulcanization, sulfur reacts with olefinic site on polymer and induces crosslinking between polymer chains. The vulcanized polymer has a network structure with polysulfide bridges. And also, it has been reported that aniline is used as organic vulcanizing accelerator of rubber (*Encyclopedia of Polymer Science and Technology*, Vol. 12, pp. 195~219, 256~266, Merman F. Mark, and Norman G. Gaylord, 1971, John Wiley & Sons Inc.), and the formation of cyclic structure of polysulfide is also reported in the presence of a nitrogen base in sulfuration of monomeric olefin (T. A. Shield, and A. N. Ku *J. Am. Chem. Soc.*, Vol. 91, pp. 5415, (1969)). For example, cyclic trisulfide is formed by the reaction of norbornylene with sulfur in the presence of an ammonia in dimethylformamide solvent (formula 1).

(formula 1)

Further, the formation of cyclic polysulfide was reported from the reaction of sulfur and cyclic-olefins, such as cyclohexene (S. Inoue, T. Tezuka, and S. Oae, *Phosphorus and Sulfur*, Vol. 4, pp. 219, (1978)), 1,3,5-cycloheptatriene (H. Fritz and C. D. Weis, *Tetrahedron Lett.*, Vol. 18, pp. 1659, (1974)) and dicyclopentadiene (W. H. Watson, P. C. Jain, P. D. Bartlett, and T. Ghosh, *Acta Cryst.*, Vol. C42, pp. 332, (1986)). Pentasulfide is also formed as a by-product along with trisulfide main product (P. D. Bartlett and T. Ghosh, J. Org. Chem., Vol. 52, pp. 4937, (1987)).

The SHC material of the present invention is prepared by the sulfuration of the unsaturated olefinic hydrocarbon in the presence of an amine. Therefore, said SHC material has high content of sulfur and no without carbon-carbon double bond to ensure high capacity and stability as electrode material (formula 2).

(formula 2)

The preferred unsaturated olefinic hydrocarbon has a high density of the double bond per carbon atom to provide high content of carbon-sulfur bond and sulfur in the resulted SHC material. The unsaturated olefinic hydrocarbon compound can be a polymer or a monomer.

It is preferred that the polymeric unsaturated olefinic hydrocarbon compound of the present invention contains more than 0.2 double bond per carbon atom. Examples of said polymer include 1,4-polybutadiene, 1,2-polybutadiene, polyisoprene, and copolymer of butadiene and isoprene.

It is also preferred that the monomeric unsaturated olefinic hydrocarbon compound is a hydrocarbon with from 5 to 20 carbons and has more than 0.2 double bond per carbon atom. Examples of said monomer include cyclopentadiene, 1,3,5-hexatriene, 1,3,5-cycloheptatriene, 1,3-cyclooctadiene, 1,4-cyclooctadiene, 1,5-cyclooctadiene, cyclooctatriene, cyclooctatetraene, 4-vinylcyclohexene and 1,5,9-cycloheptatriene.

The promoter is primary or secondary amine derivative, which is represented by the formula $R_1NH_2$ or $R_2R_3NH$, wherein $R_1$, $R_2$ or $R_3$ selected from the group consisting of hydrogen atom, $C_1~C_{10}$ alkyl, phenyl, 4-methoxyphenyl, 2-methoxyphenyl, 4-methylphenyl, 2-methylphenyl, 4-aminophenyl and 2-aminophenyl, respectively. Examples of said promoter include aniline, phenylene diamine, p-anisidine and N-phenyl-1,4-phenylenediamine.

The preferred reaction temperature range of the sulfuration is from 50 to 200° C.

The sulfuration reaction of unsaturated olefinic hydrocarbon is carried out in organic solvent. Among them, suitable solvent having boiling point more than reaction temperature is preferable. The organic solvent can be selected from the group of saturated hydrocarbon solvent such as hexane, octane, decane and decahydronaphthalene, aromatic hydrocarbon solvent such as benzene, toluene, and xylene, and polar solvent such as acetonitrile, dimethylsulfoxide, and dimethylformamide.

Another object of the present invention provides a secondary battery having high capacity and good rechargeable efficiency. The secondary battery comprises i) a positive electrode containing said SHC material with an electrically conductive collector; ii) a polymer electrolyte; and iii) a negative electrode made of alkali metal or alkali metal alloy. The positive electrode of the present invention contains the SHC material supported on an electrically conductive collector. The SHC material having electrochemically activity, high capacity and good reversibility, contains from 40 to 88% of sulfur and is represented by the formula $(CH_xS_y)_z$, wherein: x is a real number in the range of $0.5 \leq x \leq 1.75$; y is a real number in the range of $0.2 \leq y \leq 3.2$; and z is an integer equal to or greater than 5.

The SHC material of the present invention is prepared by sulfuration of the olefin in the presence of an amine promoter in a way that unsaturated double bond is saturated by sulfuration and provides a stable sulfurated material with carbon-carbon single bond skeleton. Therefore, the carbon structure of said SHC material shall not be changed during charge and discharge process, since the redox reaction takes place on sulfur moieties connected to carbon backbone.

Also, the positive electrode material of the present invention contains electrically conductive ingredients to enhance a current efficiency. Preferably, said electrically conductive ingredient are selected from the group consisting of carbon, graphite, acetylene black, an electrically conductive polymer, and their combination. Among electrically conductive polymers used as conductive ingredients for the electrode material, the compound having nitrogen or sulfur atom in the polymer skeleton or side chain is preferred. Further, accelerated electron transfer of organic disulfide in the presence of conducting polymer is described in *Nature*, 373, 598(1995). Examples of such conductive polymer include polyaniline, polypyrrole, polythiophene and their derivatives. The preferred content of carbon, graphite, acetylene black or the electrically conductive polymer is 10~150 wt % of the SHC material contained in the positive electrode.

To prepare the electrode, binder material can be added. The polymer used as the binder is poly(vinylidene fluoride), EPDM and SBR. Also, the polymer electrolyte material can be added to increase the ionic conductivity of the electrode.

The SHC material and other ingredients are dissolved or dispersed in organic solvent to prepare a coating slurry. Preferred solvent for this purpose is aprotic organic solvent, such as, N-methyl-2-pyrrolidinone and propylene carbonate.

The slurry of composite mixture is homogenized using suitable means such as magnetic stirring, mechanical stirring, sonication, or ball milling.

The positive electrode of the present invention is prepared by pasting the slurry containing the SHC material and suitable additives onto a current collector. Various coating method, such as simple painting, spin coating, bar coating and doctor-blade is used for pasting. And, the coating process is preferably carried out under an atmosphere of inert gas.

Substrate of current collector is selected from electrically conductive material such as metal, metal alloy, and graphite. Preferably, copper metal or copper alloy is used as the current collector. According to the present invention, the capacity of positive electrode is fully utilized by using a current collector made of copper metal or copper alloy. The current collector made of copper metal or copper alloy maintains the stability of each components of the battery by preventing the excess elevation of charging potential by fixing the upper limit of voltage as the oxidation potential of copper metal. The current collector is used as the form of sheet, thin film, gauze or mesh in accordance with structure of battery.

The positive electrode of the present invention is prepared by following steps of: i) dispersing the binder material and the SHC material to solvent; ii) mixing said solution with electrically conductive ingredient; iii) pasting said mixture to the current collector sheet under inert gas; and iv) drying under vacuum and compressing said plate.

The negative electrode of the present invention is selected from the group of alkali metal and alkali metal alloy. Alkali metal negative electrode generates metal cation upon oxidation and regenerates metal upon reduction. Preferred negative electrode material is lithium metal or lithium alloy which has a light equivalent weight.

In secondary battery of the present invention, a polymer electrolyte is a solid or gel type of ionically conductive polymer electrolyte. And, said polymer electrolyte comprises a MX form of lithium salt and matrix polymer. Lithium salt in the polymer electrolyte provides $X^-$ ($X^-$ is conjugate anion of acid) to positive electrode and $M^+$ to a negative electrode during charging of the cell. When the cell is discharged, $M^+$ is regenerated from the oxidation on negative electrode and $X^-$ moves from a positive electrode to a electrolyte layer.

The polymer matrix consisting polymer electrolyte provides a suitable medium for the transport of ions contained in the form of MX. The matrix polymer material for this application has a functional group containing hetero atom in repeating unit and has a certain degree of chemical affinity with lithium salt. Examples of said polymer include poly(ethylene oxide), poly(propylene oxide), polyacrylonitrile, poly(acrylonitrile-co-methyl acrylate), poly(vinylidene fluroride), and poly(vinylidene fluoride-co-hexafluoropropylene).

Further, lithium salt can be selected from the group of $LiClO_4$, $LiBF_4$, $LiPF_6$, $LiAsF_6$, $LiAsCl_6$, $LiCF_3SO_3$, $LiN(SO_2CH_3)_2$ and their combinations. The content of lithium salt in polymer the electrolyte is in the range of 5~50 mol % relative to monomer unit of the matrix polymer.

In order to enhance the processability of polymer electrolyte, organic solvent can be added as plasticizer. The polar organic solvent having carbonate group, for example, one or combination of more from propylene carbonate, ethylene carbonate, dimethyl carbonate, diethyl carbonate and methyl ethyl carbonate can be used. The content of plasticizer is 10~90 wt % of the polymer electrolyte.

The positive electrode of the present invention provides a high capacity by using the SHC material having high content of sulfur. Especially, the present invention provides a rechargeable secondary battery with a high capacity per weight, which is useful for light-weight, hand-carrying devices such as mobile telecommunication tools and notebook computer. Further, the secondary battery of the present invention consists of all solid components without any problems relating to the use of liquid such as leakage or pressure development and can be easily fabricated in a suitable shape according to the various application purpose of battery.

The present invention can be explained more concretely by following examples. However, the scope of the present invention shall not be limited to these examples.

EXAMPLE I

Preparation of Sulfurated 1,3,5-cycloheptatriene 1.35 g of 1,4-phenylene diamine (Aldrich) and 9.62 g of sulfur (Aldrich) were added to 50 ml of toluene. The mixture was stirred and heated to boiling temperature of toluene. Under reflux condition, 1,4-phenylene diamine and sulfur were completely dissolved and the solution turned red. A mixture of 5.2 ml of 1,3,5-cycloheptatriene (Aldrich) and 50 ml of toluene was slowly added to this solution for 3 hours. After heating for 24 hours, the solution became dark red and dark brown precipitation occurred. Dark brown powder was collected by filtration and washed with 200 ml of toluene and 200 ml of carbon disulfide successively. Yield of dried product was 3.99 g. Elementary analysis showed 50.4% of sulfur content of the product.

EXAMPLE II

Preparation of Sulfurated 1,3,5-cycloheptatriene 7 g of p-anisidine (Aldrich) and 11.5 g of sulfur were added to 50 ml of xylene. The mixture was stirred and heated. At a reflux temperature, the mixture of 3.1 ml of 1,3,5-cycloheptatriene and 50 ml of xylene was slowly added to the solution for 3 hours. After heating for 24 hours, the color of resulted solution changed to dark red, and the dark brown powder precipitated. Dark brown powder was collected by filtration and washed with 200 ml of toluene and 200 ml of carbon disulfide, successively. Yield of dried product was 3.7 g. Elementary analysis of the product showed 62.4% of sulfur content.

EXAMPLE III

Preparation of Sulfurated 1,3,5-cycloheptatriene

Figure 1:
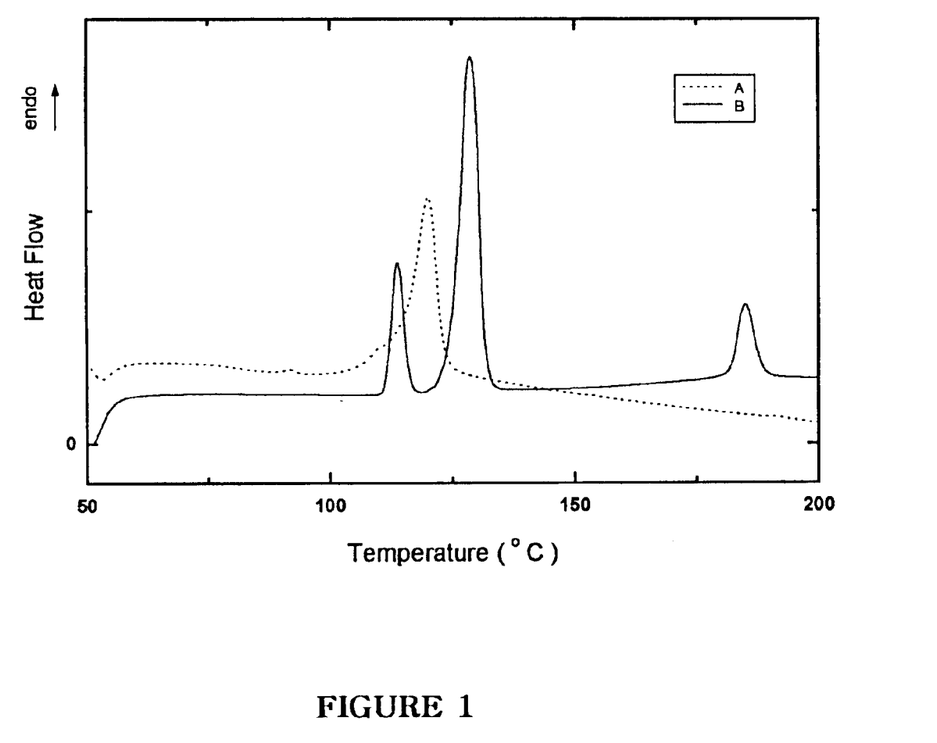
FIG. 1 shows Differential Scanning Calorimeter (DSC) curves of the sulfurated hydrocarbon (A) prepared from 1,3,5-cycloheptatriene in Example III and sulfur (B).

First, 3.0 g of 1,3,5-cycloheptatriene was added to a mixture of 90 ml of dimethylsulfoxide and 10 ml of DMF. To the resulted solution, 12.5 g of sulfur, 3.03 g of aniline (Aldrich) were added. The mixture was refluxed for 5 hours with stirring. Precipitated dark brown solid was collected by filtration and washed with 200 ml of toluene and 200 ml of carbon disulfide, successively. Yield of dried product was 13.2 g. Elementary analysis resulted %C: 17.5, %H: 1.2, %N: 0.9, %S: 81.1, which corresponds to the addition of 4 sulfur atoms to each of double bond of 1,3,5-cycloheptatriene. UV/vis absorption spectrum of elemental sulfur showed peaks at 260 and 298 nm, but sulfurated 1,3,5-cycloheptatriene showed absorption distinguishable peaks at 262, 292 and 312 nm. Also, solid $^1H$ NMR spectrum was measured. $^1H$ NMR Spectrum of 1,3,5-cycloheptatriene showed resonances at 6.6, 6.2, 5.4 and 2.2 ppm, but sulfurated 1,3,5-cycloheptatriene showed peaks at 4.6 and 2.9 ppm, indicating disppearence of double bond present in 1,3,5-cycloheptatriene. Differential Scanning Calorimetry also showed a distinctive response from sulfur as shown in FIG. 1. The splitted peaks observed from sulfur at 110~140° C. changed to a single peak and the high temperature peak of sulfur disappeared. From the results demonstrated by the above analysis, it was clearly shown that sulfur contained in sulfurated 1,3,5-cycloheptatriene is distinguished from elemental sulfur of $S_8$ type but represented as polysulfide which is formed by addition of 4 sulfur atoms per double bond.

EXAMPLE IV

Preparation of Sulfurated 1,4-polybutadiene

First, 4.79 g of liquid 1,4-polybutadiene (20% 1,2-addition, 80% cis- and trans-1,4, $M_n$ ca. 5,000, Aldrich) was dissolved in 130 ml of decahydronaphthalene by stirring the mixture at 85° C. for 16 hours. To the solution, were added 7.0 g of sulfur and 60 ml of decahydronaphthalene. The mixture was heated to 120° C. to make homogeneous solution. 2.73 g of p-anisidine was added and the resulted solution was stirred at 162° C. for 24 hours. Precipitated solid was collected by filtration, washed with 250 ml of n-hexane, and dried under vacuum at 70° C. Yield of product was 8.76 g. Elementary analysis showed 44.7% of sulfur content.

EXAMPLE V

Preparation of Sulfurated 1,4-polybutadiene

First, 1.73 g of 1,4-polybutadiene ($M_w$ 419,000) was dissolved in 130 ml of xylene by stirring the mixture at 90° C. for 3 hours. To the solution, were added 8.20 g of sulfur. The mixture was heated to 120° C. to make homogeneous solution. 1.97 g of p-anisidine was added and the resulted solution was refluxed for 45 hours. Precipitated solid was collected by filtration and washed with 125 ml of xylene and 125 ml of acetone, successively. After drying under vacuum at 100° C., 3.20 g of dark brown solid yielded. The elementary analysis resulted in 49.0% of sulfur content.

EXAMPLE VI

Preparation of Sulfurated 1,2-polybutadiene

First, 10.0 g of 1,2-polybutadiene (RB830, JSR) was dissolved in 150 ml of xylene and 23.7 g of sulfur and 5.0 g of N-phenyl-1,4-phenylenediamine (Aldrich) were added to the solution. The mixture was stirred at 140° C. for 10 hours. Precipitated dark brown solid was collected by filtration, washed with n-hexane and dried under vacuum at 90° C. Elementary analysis of the product showed 57.4% of sulfur content. In IR spectrum of sample, absorption peaks at 3,073 and 1,640 $cm^{-1}$ due to the vibration of C=C—H and C=C of 1,2-polybutadiene was absent, indicating the saturation of double bond. In UV/Vis absorption spectrum of solid sample, only a broad absorption band spanning whole UV/vis region were observed and absorption peaks at 260 and 298 nm observed from 1,2-polybutadiene were absent.

EXAMPLE VII

Preparation of Sulfurated 1,2-polybutadiene

Figure 2:
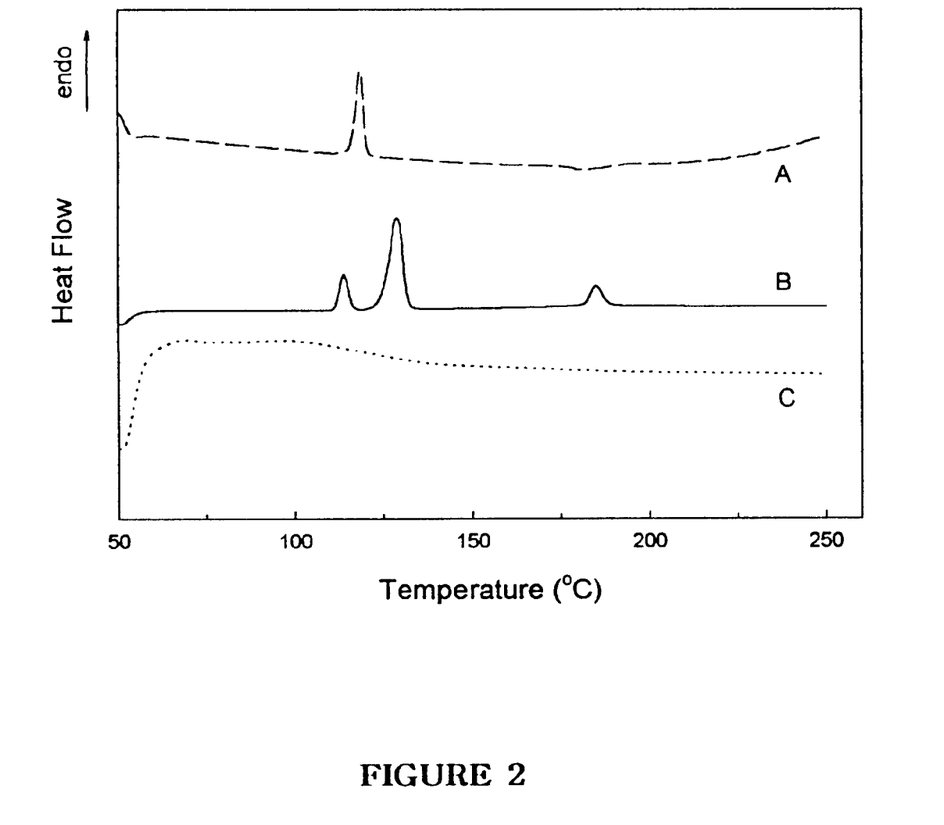
FIG. 2 shows the DSC curves of the sulfurated hydrocarbon (A) prepared from 1,2-polybutadiene in Example VII, sulfur (B) and 1,2-polybutadiene (C).

First, 4.40 g of 1,2-polybutadiene was dissolved in 130 ml of decahydronaphthalene by stirring the mixture at 80° C. for 16 hours. To the solution, were added 15.7 g of sulfur and 40 ml of decahydronaphthalene. The mixture was heated to 120° C. to make homogeneous solution. A solution of 2.20 g of 1,4-phenylenediamine (Aldrich) in 80 ml of decahydronaphthalene was added and the resulted solution was stirred at 161° C. for 18 hours. Precipitated solid was collected by filtration, washed with 250 ml of n-hexane and dried under vacuum at 90° C. Yield of product was 11.0 g. Elementary analysis showed 60.0 % of sulfur content which corresponds to the addition of 3 sulfur atoms per each double bond of 1,2-polybutadiene. In Differential Scanning Calorimetry of FIG. 2, 1,2-polybutadiene showed absorption peaks at 69° C. and 96° C. which seemed melting temperature ($T_m$), and sulfur showed two sharp narrow peaks (low temperature peak) at 114° C. and 129° C. and small peak (high temperature peak) at 185° C. But, sulfurated 1,2-polybutadiene didn't show $T_m$ peak which is characteristic to 1,2-polybutadiene indicating the change in the regularity of polymer chain. Also, sulfurated 1,2-polybutadiene showed a strong peak at 118° C., a weak peak near 200° C., and broad absorption band near 250° C. which point to the formation of polysulfide distinctive from elemental sulfur.

EXAMPLE VIII

Preparation of Sulfurated 1,2-polybutadiene

First, 4.4 g of 1,2-polybutadiene was dissolved in 130 ml of decahydronaphthalene by stirring the mixture at 80° C. for 16 hours. To the solution, were added 15.7 g of sulfur and 40 ml of decahydronaphthalene. The mixture was heated to 120° C. to make homogeneous solution. A solution of 2.5 g of p-anisidine in 80 ml of decahydronaphthalene was added and the resulted solution was stirred at 172° C. for 27 hours. Precipitated solid was collected by filtration, washed with 250 ml of n-hexane, and dried under vacuum at 90° C. Yield of product was 10.3 g. The elementary analysis resulted %C: 41.2,%H: 4.9, %N: 0.9,%S: 52.6.

EXAMPLE IX

Preparation of Polymer Electrolyte

To a mixture of propylene carbonate (Mitsubishi Chemical) and ethylene carbonate (Mitsubishi Chemical) (10.5: 7.9 of wt. ratio), 3.0 g of [poly(acrylonitrile-co-methyl acrylate)](94:6, Polyscience) and 2.3 g of $LiBF_4$ (Merck)were dissolved. The mixture was heated to 120~140° C. under a argon atmosphere. The polymer solution was cast on glass plate. Film type of polymer electrolyte layer was finished by drying at 60~80° C. The ion conductivity of prepared electrolyte layer was $10_{-1}10^{-4}$ S/cm from impedance measurement.

EXAMPLE X

Preparation of Electrode 0.3 g of poly(vinylidene fluroride) (Aldrich) was added to N-methyl-2-pyrrolidinone (Mitsubishi Chemical), and the polymer was dissolved completely. And then, 1.0 g of sulfurated 1,3,5-cycloheptatriene (81.1% of sulfur content) prepared according to example III, 0.7 g of polyaniline (Versicon, Allied Signal Corp.), and 0.5 g of acetylene black (Chevron) were added to the solution. The mixture was stirred for more than 2 days. A copper metal sheet was coated with the resulted mixture. The coated positive electrode was dried at 90° C. and pressed. The content of SHC material in the positive electrode composition is 40.0 wt %. The test cell A was prepared by combining this positive electrode, a negative electrode from lithium metal foil with nickel mesh current collector, and the gel polymer electrolyte layer which was prepared according to example IX.

EXAMPLE XI

Preparation of Electrode 0.55 g of poly(vinylidene fluroride) and 0.10 g of Brij 35 (Aldrich) were dissolved in NMP. And then, 1.40 g of sulfurated 1,2-polybutadiene (60.0% of sulfur content) prepared according to example VII, and 0.80 g of acetylene black were added to the solution. The mixture was stirred for more than 2 days. After the resulted mixture was pasted onto copper metal sheet, the positive electrode was finished by drying at 60~80° C. and pressing. The content of the SHC material in the positive electrode composition is 49.1 wt %. The test cell B was prepared by combining this positive electrode, a negative electrode from lithium metal foil with nickel mesh current collector, and the gel polymer electrolyte layer.

EXAMPLE XII

Evaluation of the Test Cells

Charge/discharge test was carried out using test cells A and B prepared according to example X and XI at room temperature under an argon atmosphere. Test cells were charged and discharged with voltage window of 1.5~4.5 V (vs. Li/Li$^+$).

Figure 3:
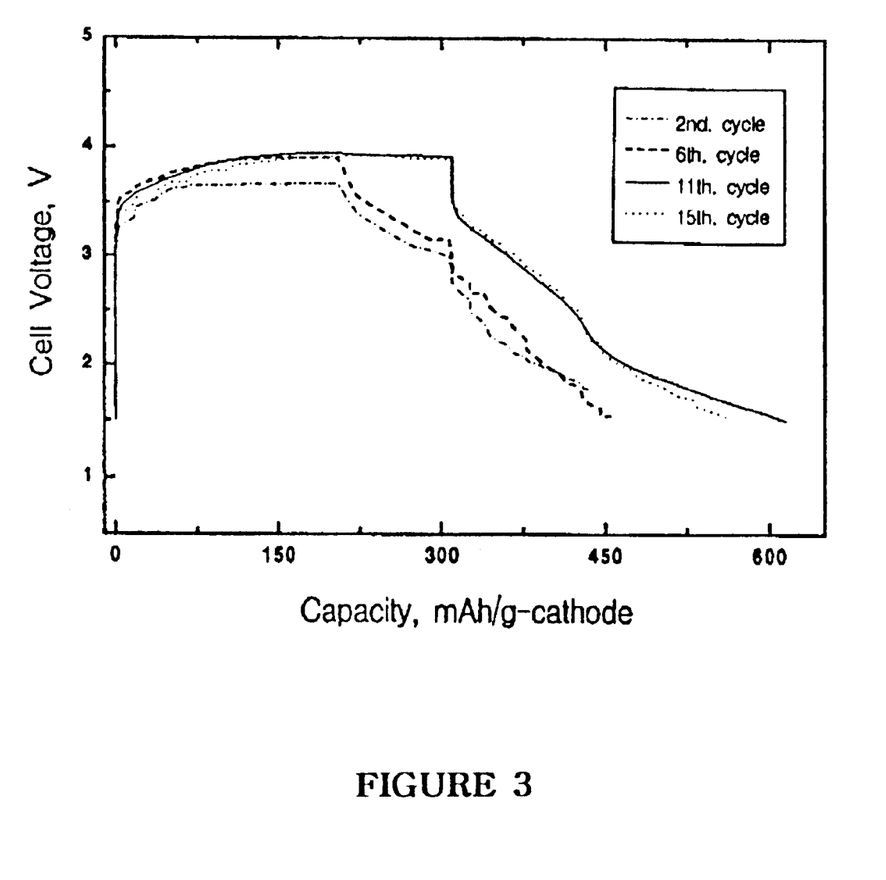
FIG. 3 shows charge/discharge curves of the cell A, in which a positive electrode contains the sulfurated hydrocarbon prepared from 1,3,5-cycloheptatriene in Example X.
Figure 4:
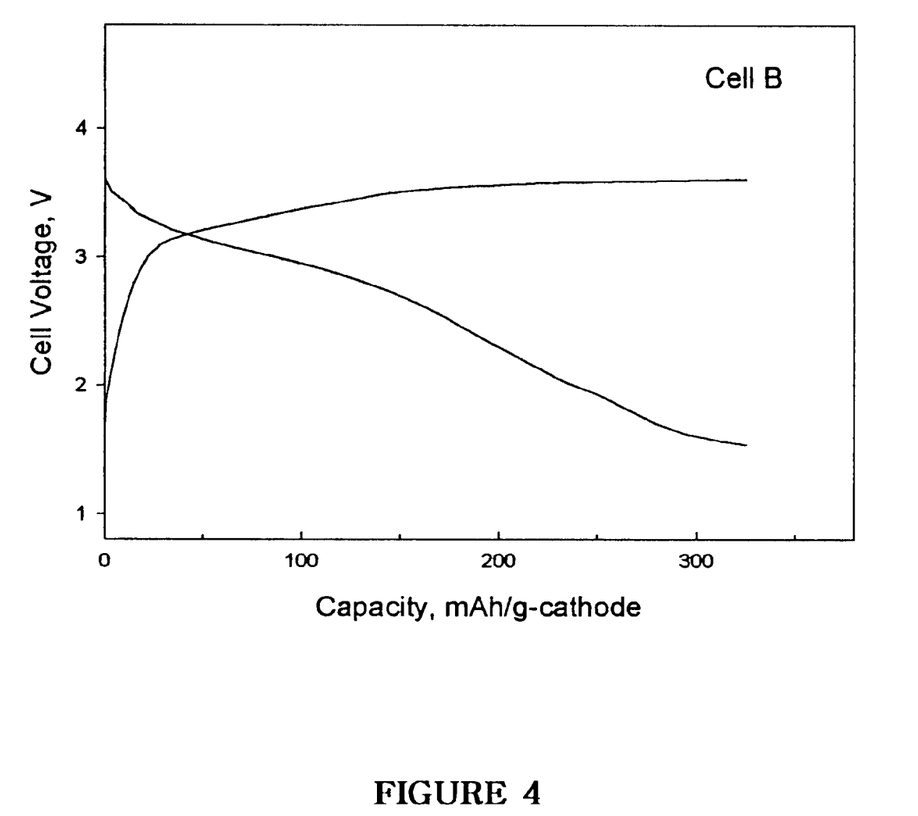
FIG. 4 shows a charge/discharge curve of the cell B, in which a positive electrode contains the sulfurated hydrocarbon prepared from 1,2-polybutadiene in Example XI.

FIG. 3 shows the charge/discharge profiles of test cell A for 11th cycle and 15th cycle. Up to 25th cycle, the discharging capacity of the test cell A was 240 mAh/g-cathode. The average discharging voltage and a discharging energy density of the test cell A was 2.5 V (vs. Li/Li$^+$) and 600 mAh/g-cathode, respectively. FIG. 4 shows 41th charging and discharging profile of test cell B.

The discharging capacity, average discharging voltage, and discharging energy density of the test cell B were 325 mAh/g-cathode, 2.54 V (vs. Li/Li$^+$), and 815 mWh/g-cathode, respectively.

From the results demonstrated by the above examples, it is clearly shown that the rechargeable cell prepared following the present invention provides high energy density and good reversibility upon repeated charge and discharge.

What is claimed is:

1. A sulfurated hydrocarbon material prepared by the sulfuration of unsaturated olefinic hydrocarbon compound, in the presence of a promoter in a solvent system, wherein said sulfurated hydrocarbon material contains from 40 to 88% of sulfur, which is represented by the formula $(CH_xS_y)_z$, wherein: x is a real number in range of $0.5 \leq x \leq 1.75$; y is a real number in range of $0.2 \leq y \leq 3.2$; and z is an integer equal to or greater than 5; and wherein said unsaturated olefinic hydrocarbon compound is a polymer selected from the group consisting of 1,4-polybutadiene, 1,2-polybutadiene, polyisoprene, and copolymer of butadiene and isoprene.

2. The sulfurated hydrocarbon material according to the claim 1, wherein the structure of sulfurated hydrocarbon material contains at least one structure of the followings:

wherein, n is an integer in the range of $1 \leq n \leq 6$; m is an integer in the range of $1 \leq m \leq 8$; 1 is an integer equal to or greater than 1.

3. The sulfurated hydrocarbon material according to the claim 1, wherein the polymer is a olefinic polymer containing more than 0.2 double bond ratio per one carbon atom.

4. The sulfurated hydrocarbon material according to the claim 1, wherein the organic solvent is selected from the group consisting of toluene, xylene, decahydronaphthalene, dimethylsulfoxide and N,N-dimethylformamide.

5. The sulfurated hydrocarbon material according to the claim 1, wherein the reaction temperature is from 50 to 200° C.

6. A secondary battery comprising;
   i) a positive electrode containing at least one the sulfurated hydrocarbon material disclosed in claim 1 with an electrically conductive collector;
   ii) a polymer electrolyte; and
   iii) a negative electrode made of alkali metal or alkali metal alloy.

7. The secondary battery according to the claim 6, wherein the positive electrode comprises at least one electrically conductive ingredient selected from the group consisting of electrically conductive carbon, graphite, acetylene black and an electrically conductive polymer.

8. The secondary battery according to the claim 7, wherein the electrically conductive polymer is selected from the group consisting of polyaniline, polypyrrole, polythiophene and their derivatives.

9. The secondary battery according to the claim 6, wherein said electrically conductive collector is made of metal, metal alloy or graphite.

10. The secondary according to claim 9, wherein said metal is copper metal or copper alloy.

11. The secondary battery according to the claim 6, wherein the alkali metal is lithium metal or lithium alloy.

12. The secondary battery according to the claim 6, wherein the polymer electrolyte is a solid or gel form of ion conductive polymer electrolyte comprising lithium salt.

13. A sulfurated hydrocarbon material prepared by the sulfuration of unsaturated olefinic hydrocarbon compound, in the presence of a promoter in a solvent system, wherein said sulfurated hydrocarbon material contains from 40 to 88% of sulfur, which is represented by the formula $(CH_xS_y)_z$, wherein: x is a real number in range of $0.5 \leq x \leq 1.75$; y is a real number in range of $0.2 \leq y \leq 3.2$; and z is an integer equal to or greater than 5;

wherein the unsaturated olefinic hydrocarbon compound is a monomer; and wherein said unsaturated olefinic hydrocarbon compound is an C5~C20 olefin containing more than 0.2 double bond ratio per carbon atom; and wherein said C5~C20 olefin is selected from the group consisting of cyclopentadiene, 1,3,5-hexatriene, 1,3,5-cycloheptatriene, 1,3-cyclooctadiene, 1,4-cyclooctadiene, 1,5-cyclooctadiene, cyclooctatriene, cyclooctatetraene, 4-vinylcyclohexene and 1,5,9-cycloheptatriene.

14. A sulfurated hydrocarbon material prepared by the sulfuration of unsaturated olefinic hydrocarbon compound, in the presence of a promoter in a solvent system, wherein said sulfurated hydrocarbon material contains from 40 to 88% of sulfur, which is represented by the formula $(CH_xS_y)_z$, wherein: x is a real number in range of $0.5 \leq x \leq 1.75$; y is a real number in range of $0.2 \leq y \leq 3.2$; and z is an integer equal to or greater than 5; and wherein the promoter is primary or secondary amine derivative, which is represented by the formula $R_1NH_2$ or $R_2R_3NH$ wherein, $R_1$, $R_2$ or $R_3$ selected from the group consisting of hydrogen atom, $C_1$~$C_{10}$alkyl, phenyl, 4-methoxyphenyl, 2-methoxyphenyl, 4-methylphenyl, 2-methylphenyl, 4-aminophenyl and 2-aminophenyl.

15. The sulfurated hydrocarbon material according to the claim 14 wherein the promoter is selected from the group consisting of aniline, phenylene diamine, p-anisidine and N-phenyl-1,4-phenylenediamine.

* * * * *